United States Patent
Carroll, III et al.

(12) 
(10) Patent No.: US 6,247,745 B1
(45) Date of Patent: Jun. 19, 2001

(54) FORMED ENERGY ABSORBER

(75) Inventors: Phillip Patrick Carroll, III, Bloomfield Hills; Joel Matthew Cormier, Ferndale; Donald Scott Smith, Commerce Township; Richard Francois Audi, Dearborn, all of MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 09/499,205

(22) Filed: Feb. 7, 2000

Related U.S. Application Data

(63) Continuation of application No. 09/328,196, filed on Jun. 8, 1999, which is a continuation of application No. 09/018,666, filed on Feb. 4, 1998, now Pat. No. 6,017,084.

(51) Int. Cl.[7] .................................................. B60R 21/04
(52) U.S. Cl. .................. 296/189; 296/39.1; 293/133; 280/751; 188/371
(58) Field of Search ................................... 296/189, 39.1, 296/188; 293/102, 132, 133, 109, 110; 280/751, 748; 206/521.4, 521.9, 521.8; 188/377, 371

(56) References Cited

U.S. PATENT DOCUMENTS

| | | |
|---|---|---|
| 2,349,907 | 5/1944 | Kos et al. . |
| 3,871,636 | 3/1975 | Boyle . |
| 3,933,387 * | 1/1976 | Salloum et al. . |
| 3,997,207 | 12/1976 | Norlin . |
| 4,029,350 | 6/1977 | Goupy et al. . |
| 4,190,276 | 2/1980 | Hirano et al. . |
| 4,321,989 | 3/1982 | Meinzer . |
| 4,352,484 | 10/1982 | Gertz et al. . |
| 4,413,856 | 11/1983 | McMahan et al. . |
| 4,635,981 | 1/1987 | Friton . |
| 4,666,130 | 5/1987 | Denman et al. . |
| 4,720,261 | 1/1988 | Fishwick et al. . |
| 4,844,213 | 7/1989 | Travis . |
| 4,909,661 | 3/1990 | Ivey . |
| 5,033,593 | 7/1991 | Kazuhito . |
| 5,141,279 | 8/1992 | Weller . |
| 5,165,990 | 11/1992 | Nakano . |
| 5,192,157 | 3/1993 | Leturner . |
| 5,306,066 | 4/1994 | Saathoff . |
| 5,364,682 | 11/1994 | Tanaka et al. . |
| 5,435,619 | 7/1995 | Nakae et al. . |
| 5,500,037 | 3/1996 | Alhamad . |
| 5,573,272 | 11/1996 | Teshima . |
| 5,636,866 | 6/1997 | Suzuki et al. . |
| 5,660,426 | 8/1997 | Sugimori et al. . |
| 5,700,545 | 12/1997 | Audi et al. . |
| 5,727,826 | 3/1998 | Frank et al. . |
| 5,762,392 | 6/1998 | Suga . |

* cited by examiner

*Primary Examiner*—Joseph D. Pape
(74) *Attorney, Agent, or Firm*—Brooks & Kushman PC

(57) ABSTRACT

A modular energy absorbing assembly 10 comprising at base 12, and at least one energy absorbing module 14 associated with the base for accommodating deformation of the assembly. At least some of the energy absorbing modules have a plurality of recesses 16 defined within the base. Each of the plurality of recesses has a floor and at least one wall extending from the floor to the base. An intermediate segment extends between the floor and the at least one wall. The intermediate segment has an average radius (R). At least some of the recesses are oriented such that their floors are substantially orthogonal to a major incident component of the impacting force and their walls are inclined at an angle (α) to the major incident component of the impacting force, where (0<α<45 degrees), in order to maximize energy absorption by the wall over a given distance. The wall at least partially collapses and at least some of the recesses become at least partially compressed during energy absorption.

13 Claims, 4 Drawing Sheets

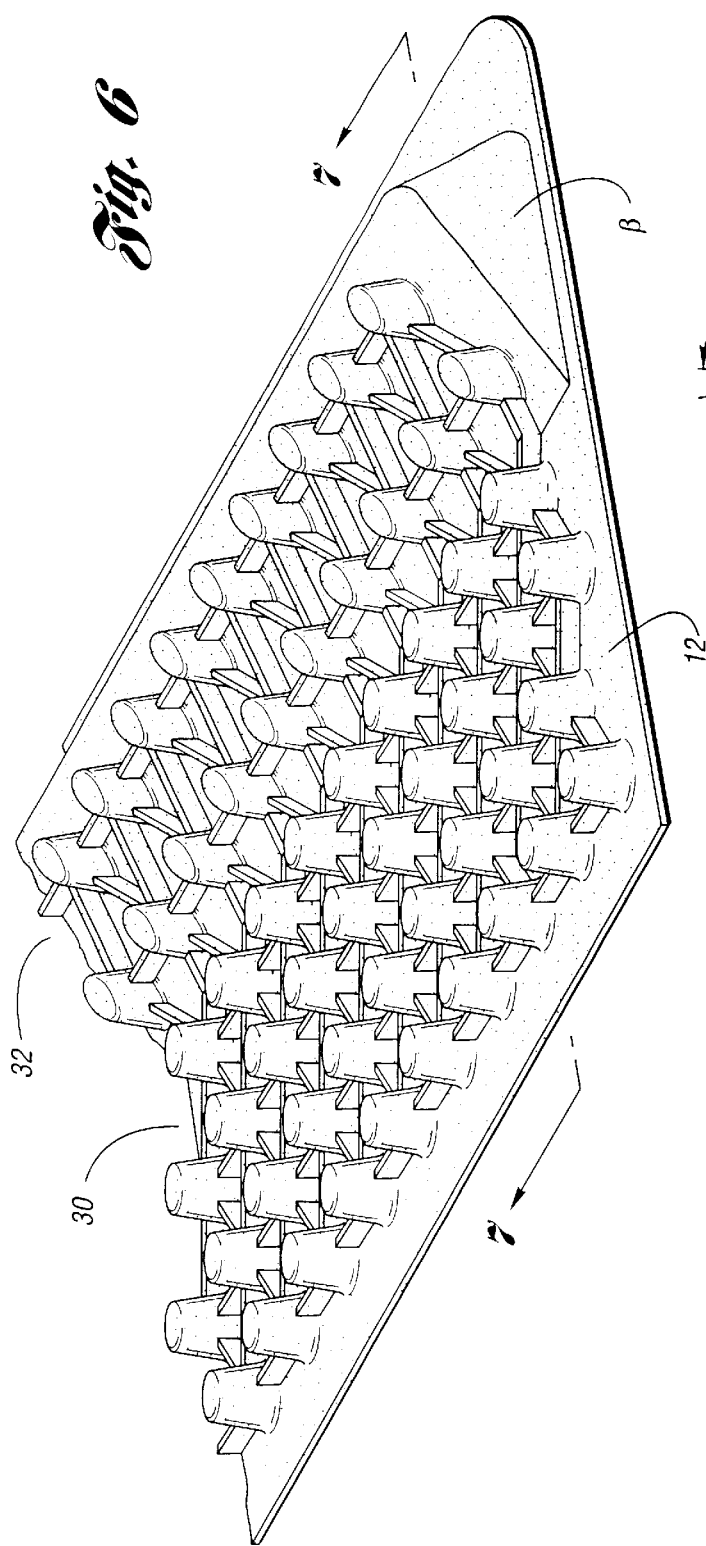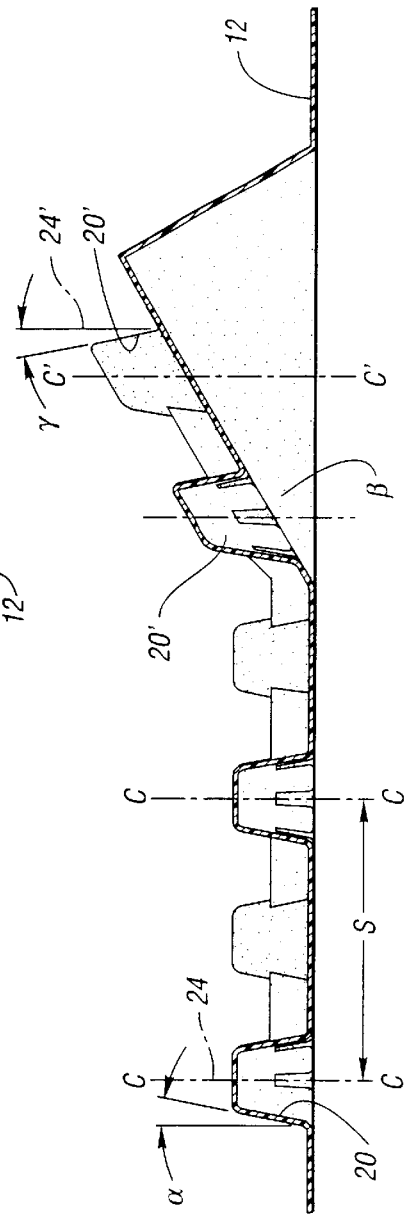

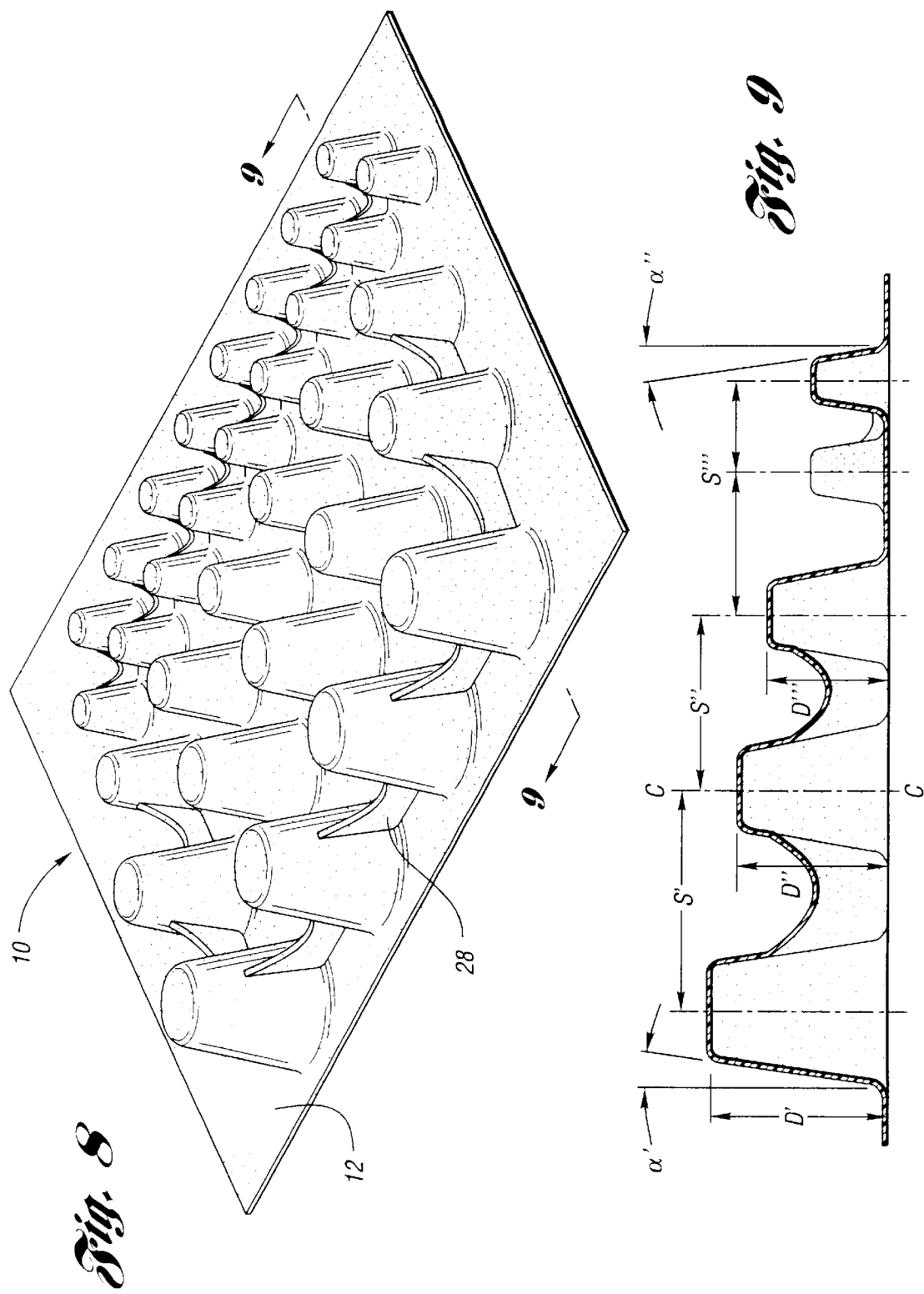

FORMED ENERGY ABSORBER

CROSS-REFERENCE TO RELATED APPLICATIONS

This application is a continuation of U.S. application Ser. No. 09/328,196 filed Jun. 8, 1999, which is a continuation of U.S. patent Ser. No. 09/018,666 filed Feb. 4, 1998 (now U.S. Pat. No. 6,017,084), the disclosures of which applications being incorporated by reference herein.

TECHNICAL FIELD

This invention relates to an energy absorber for decelerating an object that impacts the absorber.

BACKGROUND ART

The prior art discloses numerous devices that dissipate mechanical energy in various applications. Examples include protective packaging used in shipping containers, crash helmets, bumpers and vehicular interiors.

Ideally, the most efficient energy absorber exerts a constant resistive force to decelerate an impacting object over a distance that the impacting object deflects the absorber. The most efficient curve would have a constant slope of zero. Elastomeric solids many times act as springs where the force-deflection curve is essentially a straight line of a given slope. Many foam materials display a similar force-deflection curve, although the curves are usually of not of constant slope.

Commonly owned U.S. Pat. No. 5,700,545, entitled Energy Absorbing Structure, discloses an energy absorbing device that offers a nearly constant resistance force over a deflection distance, which if exactly constant, would be theoretically most efficient in absorbing energy. The disclosure of this patent is incorporated herein by reference. Energy is absorbed by a lattice of interconnected strands of material with apertures between the strands, such that upon deformation the strands coalesce and the apertures close.

Commonly owned U.S. Ser. No. 09/018,666 discloses stranded structures that are oriented such that nearly all the metal structure is substantially in the crush plane. The strips of stranded metal are connected by the incident member. This reduces cost and weight of the assembly.

Commonly owned U.S. Ser. No. 09/328,196 describes a structure wherein the stranded metals are assembled into channels in a base and/or a structure of recesses formed in the base. Either or both structures may provide impact protection.

These and other energy absorbing members, in the automobile environment, are used to protect vehicle occupants and must meet the standard for automotive interiors (Federal Motor Vehicles Safety Standard 201) which is incorporated herein by reference. The standard requires that interior components must be tested using a 10 Lbm headform impacting the surface at 15 MPH. A measurement of HIC(d) (head injury criteria) dummy)) is assessed according to a formula set forth in FMVSS 201.

The value of HIC(d) should not exceed 1000 when calculated in accordance with the formula provided by FMVSS201.

The prior art leaves unsolved production problems that stem from relatively expensive and in some cases, less effectual approaches. Injection molding, reaction molding, extruding, blow molding, honeycomb formation, and stranded metal manufacture can be relatively costly. Additionally, it can be difficult to mold very thin wall thickness with some molding technologies.

DISCLOSURE OF INVENTION

It is an object of the present invention to provide a more cost effective, efficient energy absorber.

The invention includes a modular energy absorbing assembly with a base, and at least one energy absorbing module extending from the base for accommodating deformation of the assembly.

At least some of the energy absorbing modules have a plurality of recesses defined within the base. Each of these recesses has a floor and at least one wall extending from the floor to the base. In one embodiment, the wall is frusto-conical in shape.

At least some of the recesses are oriented such that their floors are substantially orthogonal to a major incident component of the impacting force. Their walls are inclined at an angle ($\alpha$) to the major incident component of the impacting force, such that ($0<\alpha<45$ degrees), in order to maximize energy absorption by the wall over a given distance.

After impact, the wall at least partially collapses and at least some of the recesses become at least partially compressed or shatter during energy absorption. The assembly serves to decelerate an object that impacts thereupon.

BRIEF DESCRIPTION OF DRAWINGS

FIG. 6 is a quartering perspective view of a second alternate embodiment of the disclosed invention;

FIG. 7 is a cross-sectional view taken along the line 7—7 of the embodiment of FIG. 6;

FIG. 8 is a quartering perspective view of a third alternate embodiment of the disclosed invention; and FIG. 9 is a cross-sectional view taken along the 9—9 of the embodiment depicted in FIG. 8.

BEST MODE FOR CARRYING OUT THE INVENTION

Figure 1:
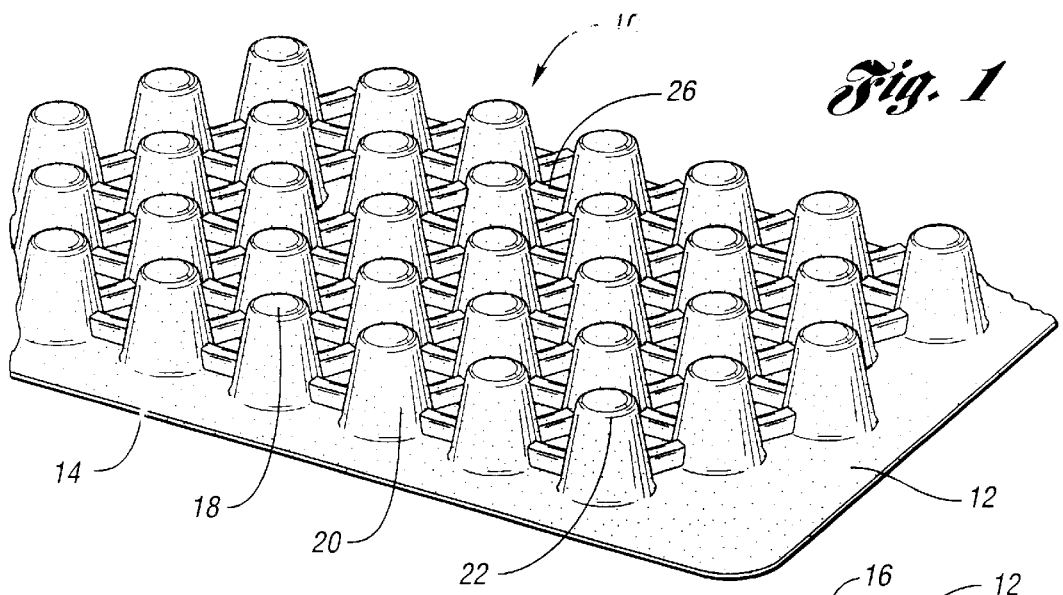
FIG. 1 is a quartering perspective view of a modular energy absorbing assembly manufactured in accordance with the present invention.
Figure 2:
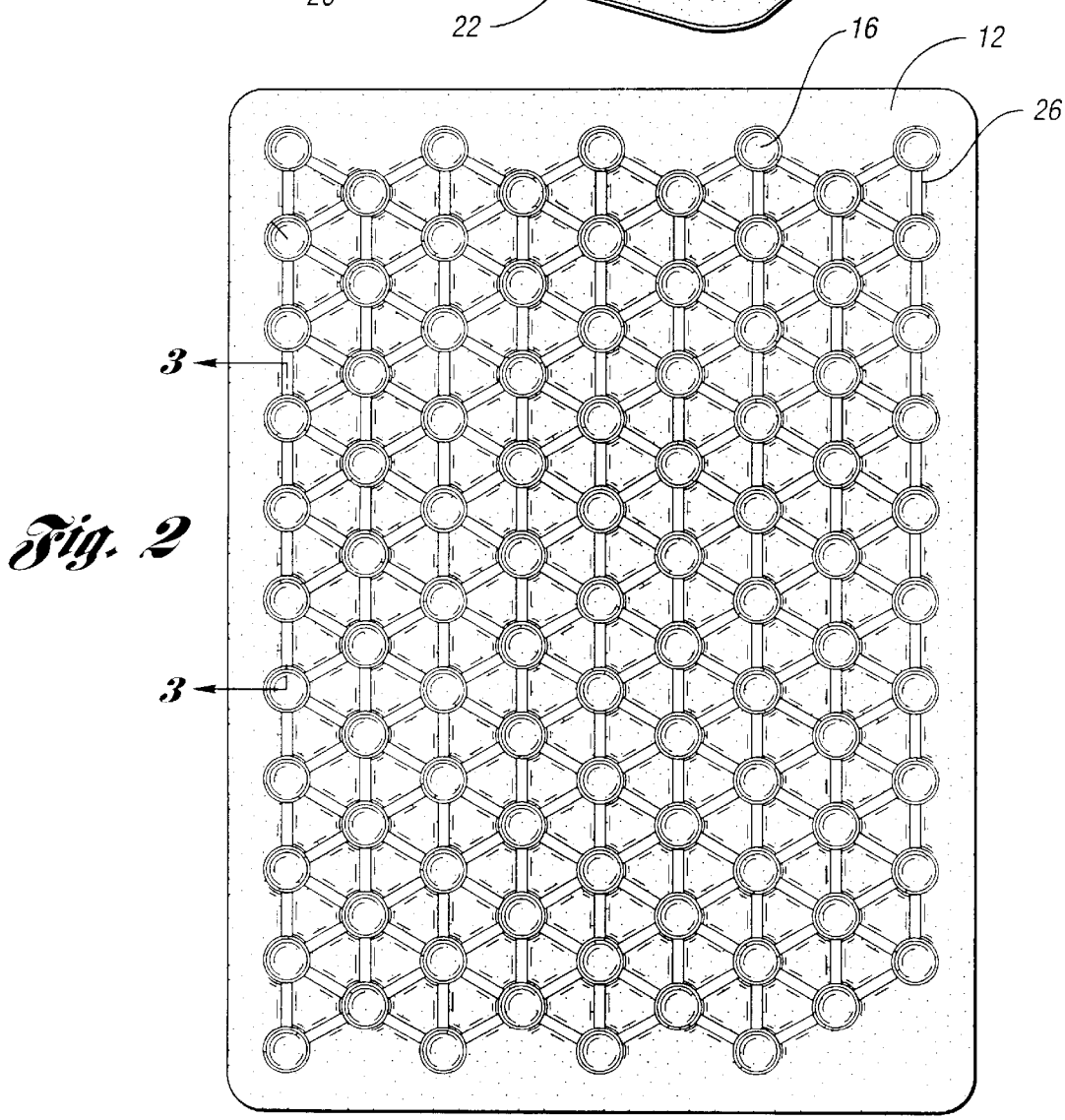
FIG. 2 is a bottom plan view thereof.
Figure 3:
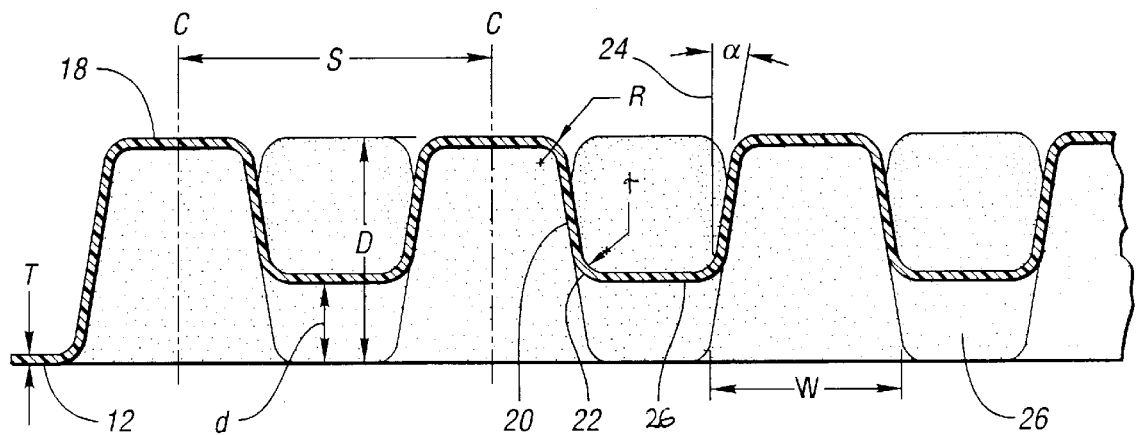
FIG. 3 is a cross-sectional view of the invention depicted in FIG. 2, taken along the 3—3 thereof.

Referring first to FIGS. 1–3 of the drawings, there is depicted a modular energy absorbing assembly 10 which has a base 12 and at least one energy absorbing module 14 associated with the base for accommodating deformation of the assembly. Each energy absorbing module 14 has a plurality of recesses 16 defined within and integral with the base. Each of the recesses has a substantially flat, or domed floor 18, and at least one wall extending from the floor to the base. Interposed between the floor 18 and the at least one wall is an intermediate segment 22. The intermediate segment has an average radius (R), or may be non-circular (termed herein as "curvilinear"). It will be apparent that in many applications, the module energy absorbing assembly 10 may perform satisfactorily in an inverted position.

At least some of the recesses are oriented such that their floors are substantially orthogonal to a major incident component 24 (FIG. 3) of the impacting force. In a given recess, the wall is inclined at an angle (α) to the major incident component of the impacting force. The angle (α) is selected so that it lies between zero and 45 degrees in order to maximize energy absorption by the wall over a given distance. The wall at least partially collapses during energy absorption, and at least some of the recesses become at least partially compressed or shatter, in some cases. In a coordinated manner arising from mutual support afforded by adjacent recesses, the assembly serves to decelerate an object that impacts with an incident force thereupon.

Thus, the invention embraces a sheet of material with recesses formed in it. The sheet remains continuous after recesses are made. Preferably, the recesses are integral with or are monolithic with the base and sheet from which they are formed. When thermoforming is the manufacturing method of choice, it will be appreciated that wall thickness may be smaller adjacent the base than adjacent the floor of a given recess.

Continuing with particular reference to FIG. 3, the recesses 18 have imaginary central lines (C) which are spaced apart by a distance (S). The average depth of the recesses depicted in the embodiment of FIG. 3 is represented by the letter (D). The reference letter (d) represents the average depth of a channel 26 which communicates with adjacent recesses. The recesses are further characterized by the reference letter (W) which represents the diameter of the recess measured at the base, or basal plane 12. As illustrated, the base has a thickness represented by the reference letter (T). Another design variable is the radius (r) (FIG. 3) which characterizes the joinder of a wall 20 with a channel 26.

It will be noted from the views of FIGS. 1 and 3 that the walls 20 are connected by the floor 18 of a given recess, while walls of adjacent recess are connected by the base 12 or channel 26.

Continuing with reference to FIG. 3, the line 24 represents a major incident component of the impacting force, with respect to which the walls 20 are inclined at an angle (α), where (α) lies between 1 and 45°. In operation, the wall at least partially collapses (or loses structural integrity by shattering) and some of the recesses become compressed during energy absorption while decelerating an object that impacts thereupon.

In the preferred embodiment, at least one wall is generally shaped as a frusto-conical surface and the intermediate segment has an average radius (R) of about 0.5 mm.

Impact tests have shown good results where the ratio of (D) to (W) is between about 0.5 and 0.3, while the ratio of (W) to (S) is between about 0.2 and 0.7. Good results have also been obtained when the recesses are further characterized by depth (D) to side thickness (T) ratio between about 4 and 20. Depending on the energy absorption requirements of the specific application, the depth of the channel (d) may be up to the depth (D) of the recess.

In various applications, experimentation has revealed that for a given geometry of recess, the inter-recess spacing (S) may affect the particular deformation characteristics. Preferably, the imaginary center (C) of at least some of the recesses is located at an apex of an equilateral triangle when viewed in the direction of the impacting object.

Figure 4:
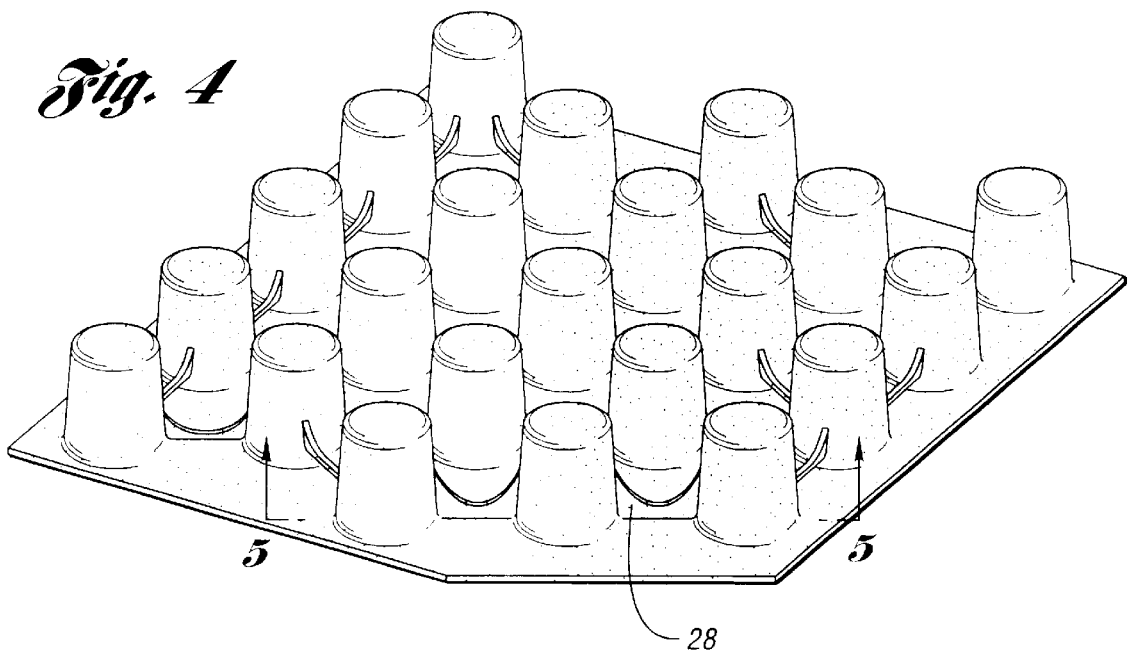
FIG. 4 is a quartering perspective view of an alternate embodiment of the disclosed invention.
Figure 5:
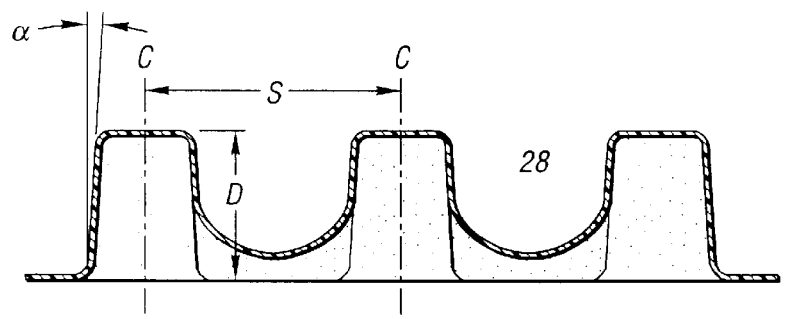
FIG. 5 is a cross-sectional view of the embodiment depicted in FIG. 4 taken along the line 5—5 thereof.

Turning now to FIGS. 4–5, there is depicted an alternate embodiment of the invention wherein structural reinforcing ribs, rather than channels, connect at least some of the recesses.

In the preferred embodiment, the recesses may be joined by channels 26 of various depths (d) (FIG. 3) and shapes. Generally, the channels 26 are formed such that their depth (d) is less than the depth (D) of the floor 18 below the base 12.

Turning now to FIGS. 6–7, there is depicted a second alternate embodiment of the present invention. In this embodiment, the modular energy absorbing assembly comprises two or more modules 30,32 which are inclined with respect to each other by an angle (β). In the module 32, the recesses 20' characterized by an imaginary line C'—C' which extends orthogonally to the base 12 such that the axes C'—C' and C—C (associated with the modules 30, 32) are parallel. Upon inspection of FIGS. 6–7, it will be appreciated that the angle (β) essentially defines the inclination of intersection planes. In practice, however, the bases of intersecting modules 30, 32 may not intersect discretely along a joinder line, but instead be joined by a curvilinear intersecting segment (not shown). It may also be appreciated that the module 32 may be formed by folding a portion of the base 12 of module 30, such that the axes C'—C' may be inclined to the axes C—C.

The recesses may be shaped as truncated cones, sections of ellipsoids, sections of hyperboloids, or similar constructions, and may be of mixed shapes within a given energy absorbing module.

Continuing with reference to FIG. 7, in the first module (left hand side), an angle (α) denotes the angle of inclination of the wall 20 with respect to the center line C of a representative recess. In the second module, the angle (γ) represents the inclination of wall 20' with respect to a major incident component of the impacting force 24'.

In light of this disclosure, it will be apparent that the energy absorbing characteristics of the disclosed modular energy absorbing assembly can be tailored to suit the needs of the particular application by suitable combination of depth (D) of the recess, depth (d) of the channels, inter-recess spacing (S), wall inclination (α,γ), inter-module inclination (β), and recess shape.

Turning now to FIGS. 8–9, there is depicted a third alternate embodiment of the present invention wherein the modular energy absorbing assembly 10 includes recesses that are placed at intervals which include irregular center-to-center distances across the base 12. In FIG. 9, the depths of the recesses are depicted by the reference letters D', D", D''', etc. The inter-recess space is represented by the reference letters S', S", S''', etc. Customized angles of inclination are illustrated by the symbols α' and α".

Still further alternative embodiments comprehend the formation of one or more troughs or catches (not shown) that are generally defined within the bases 12 so that wires, tubes, and the like can be accommodated therein and so that one or more fluid conduits can be provided by the assembly.

Reference was made earlier to quantitative acceptance criteria which mandate that the HIC(d) value computed according to the FMVSS 201 formula shall not exceed 1000. The table below compares HIC(d) values of the disclosed invention with the values exhibited by competitive products:

| Drop Tower HIC(d) Performance Baseline Stiffness = 1500 HIC(d); Sample Height = 20 mm | |
| --- | --- |
| | HIC(d) |
| Invention | 927 |
| Polyurethane Foam (5.5 PCF) | 1024 |

Reference was also made above to the formation of one or more bending axes between adjacent energy absorbing modules in order to conform to abrupt contour changes of a substrate to which the energy absorbing assembly is attached. The purpose of such axes is to orient an imaginary central line of the energy absorbing module substantially normally to a reaction surface. Depending upon the impact environment, these axes may either extend along the base (basal plane) or along an imaginary line connecting recesses and/or ribs.

One preferred technique for manufacturing the disclosed embodiments of the present invention is to use a thermoforming process, which begins with a thermoplastic sheet. Conventionally, many types of thermoplastic resins may be used in a variety of sizes and thicknesses. Suitable materials for use in the disclosed thermoplastic process include: acetate, polystyrene, polyethylene (low or high density), polypropylene, polyester, and polyvinyl chloride (PVC). Other suitable materials include ABS, acrylics, butyrate, PETG, polycarbonate, polystyrene, propionate, and vinyl.

Sheet thickness (T) affects not only the thermo forming process steps and the characteristics of the modular energy absorbing assembly made thereby, but also significantly affects manufacturing economics. In general, less material is required to produce an assembly of the type disclosed herein when using lighter weight, thinner-gauge plastics. Conversely, the use of heavier-gauge materials requires more material, which tends to increase costs. Other things being equal, by a suitable selection of the design factors discussed herein, manufacturing economies can be realized while producing an energy absorbing assembly which is tailored to suit the needs of the particular operational environment.

A useful summary of conventional thermoforming arts is found in J. Florian, PRACTICAL THERMO FORMING, 2d Ed. (1996), Chs. 2–5 of which being incorporated herein by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular energy absorbing assembly comprising:

a base; and at least one energy absorbing module associated with the base for accommodating deformation of the assembly, at least some of the at least one energy absorbing modules having a plurality of separated recesses defined within the base, each of the plurality of recesses having a floor, and at least one curvilinear wall extending from the floor to the base, wherein at least some of the plurality of recesses are oriented such that their floors are substantially orthogonal to a major incident component of the impacting force and their walls are inclined at an angle alpha to the major incident component of the impacting force, where alpha lies between 0 and 45 degrees, the wall at least partially collapsing and at least some of the recesses becoming at least partially compressed during energy absorption, the assembly serving to decelerate an object that impacts thereupon with an incident force in order to maximize energy absorption over a given distance.

2. The modular energy absorbing assembly of claim 1, further comprising an intermediate segment having a radius R extending between the floor and the at least one wall.

3. The modular energy absorbing assembly of claim 2, wherein the at least one wall has a generally frusto-conical shape, the intermediate segment having an average radius R of at least 0.5 mm.

4. The modular energy absorbing assembly of claim 1, wherein the recesses are characterized by a depth D below the base and a diameter W at the base, such that the ratio of depth D to diameter W is between about 0.5 and about 0.3.

5. The modular energy absorbing assembly of claim 4, wherein the recesses are further characterized by a center-to-center spacing S, such that the ratio of diameter W to center-to-center S is between about 0.2 and about 0.7.

6. The modular energy absorbing assembly of claim 4, wherein the recesses are further characterized by a center-to-center spacing S such that the ratio of depth D to center-to-center spacing S is between about 0.1 and about 2.0.

7. The energy absorber of claim 4, wherein the base has a thickness T and the recesses have a ratio of depth D to thickness T ratio between about 4 and about 20.

8. The energy absorber of claim 1, wherein at least two of recesses are connected by a channel of a depth d, wherein the depth of the channel d may be sized up to a depth D of the recess.

9. The energy absorber of claim 1, wherein each recess has an imaginary center line C, and at least some of the center lines are located at the apices of equilateral triangles when viewed in the direction of the impacting object.

10. The modular energy absorbing assembly of claim 1, further including an intermediate segment extending between the floor and the at least one wall, the intermediate segment having a curvilinear contour.

11. The modular energy absorbing assembly of claim 1, wherein at least two of the recesses are connected by a rib for supporting the walls of adjacent recesses, thereby promoting stiffness in the assembly.

12. The modular energy absorbing assembly of claim 1, wherein the absorber is manufactured by a process selected from the group consisting of thermoforming, vacuum forming, forging, pressing and combinations thereof.

13. The modular energy absorbing assembly of claim 1, wherein the at least one energy absorbing module comprises two modules which are inclined at an angle beta and wherein each recess associated with a first module is characterized by a center line C—C which lies parallel to a center line C'—C' which characterizes recesses associated with a second module.

* * * * *